United States Patent [19]

Greenberg

[11] 4,299,790
[45] Nov. 10, 1981

[54] METHOD AND COMPOSITION FOR FORMING A PLASTER OBJECT

[76] Inventor: Allen A. Greenberg, 3531 N. 47 Ave., Hollywood, Fla. 33021

[21] Appl. No.: 104,782

[22] Filed: Dec. 18, 1979

[51] Int. Cl.³ ............................................. C04B 11/22
[52] U.S. Cl. .................................. 264/299; 106/114; 106/209; 106/214
[58] Field of Search ............... 106/111, 114, 209, 214; 264/299; 128/91 R

[56] References Cited

U.S. PATENT DOCUMENTS

| 3,692,552 | 9/1972 | Ruggeberg | 106/209 |
| 3,958,997 | 5/1976 | Greenberg | 106/209 |
| 3,989,220 | 11/1976 | Greenberg | 249/105 |
| 4,253,450 | 3/1981 | Smith | 106/114 |

*Primary Examiner*—Lorenzo B. Hayes
*Attorney, Agent, or Firm*—Fidelman, Wolffe & Waldron

[57] ABSTRACT

Formation of toy figurines from tap water and a molding powder mixture of calcium sulphate hemihydrate with xanthan gum in a shaker molding assembly. The molded article dries into a porous lightweight object. The materials are non-toxic.

7 Claims, No Drawings

METHOD AND COMPOSITION FOR FORMING A PLASTER OBJECT

INTRODUCTION

The present invention relates to a composition adapted to forming a molded object in a shaker mold. Water and a molding powder mixture are shaken together in a shaker-mixer-mold device so as to intimately mix the water and the molding powder, whereafter the fluid slurry is poured into a mold cavity wherein the slurry solidifies quickly into a solid object, the shape of the mold.

Reference is made to prior U.S. Pat. Nos. 3,958,997 and 3,989,220 for detailed description of the molding method and for an exemplary embodiment of the molding apparatus. The present invention relates specifically to a novel molding composition adapted for use in the shaker molding assembly of U.S. Pat. No. 3,989,220, to the method of molding with the novel composition and to the porous plaster object which results.

BRIEF STATEMENT OF THE INVENTION

Briefly stated the molding powder composition of the present invention comprises a dry mixture of finely divided xanthan gum and calcium sulphate hemihydrate.

A second aspect of this invention is the method of forming molded objects with the molding powder composition.

Another aspect of the invention is the molded light weight cast object formed by mixing the dry composition with water and molding same.

In addition to xanthan gum and calcium sulphate hemihydrate, the molding powder will normally contain several optional ingredients, such as calcium sulphate dihydrate, potassium sulphate, cornstarch, even preservatives and colorants. Moreover, the calcium sulphate hemihydrate is desirably, a mixture of alpha plaster and beta plaster. Some of the optional ingredients, notably preservatives and corn starch, are already present in some commercially available plasters and employment of such a mixture as a component of the present composition is contemplated.

DISCUSSION OF THE INVENTION

Overall the rationale of the present invention is to fulfill amusement and education needs of young children through their use of the shaker-molding assembly described in U.S. Pat. No. 3,989,220. The child can make his or her very own figurines and then can color the figurines. Time spent on the molding operation is playtime, so to speak.

The principal objects of the present invention are conditioned by this rationale; they are:
  to provide a room temperature molding composition;
  to provide molding composition productive of a lightweight relatively high strength molded object;
  to provide a non-toxic molding composition.

The composition of this invention is well adapted to use with the shaker molding assembly of U.S. Pat. No. 3,989,220. Thus, a package with the composition of this invention can be emptied into a cup containing a measured out quantity of water, then the cup is fitted into the shaker-mold assembly, and thereafter shaken (with the relatively low agitation capability and attention to detail of a child) to form a uniform slurry of pourable consistency. When the cup is turned upside down, and the slurry contents emptied into the mold, they fill the mold without foaming and few, if any, bubbles. The composition sets in a matter of minutes, and can be removed from the mold.

Gypsum, i.e., calcium sulphate hemihydrate, formulations have long been used to plaster walls and to form gypsum wallboard. In consequence, an extensive body of prior art knowledge thereon exists. Gypsum formulations with controlled set times as little as 3-4 minutes to initial set, and 10-30 minutes to final set are known to the art. Commercial preparations widely available have physical characteristics such as particle size appropriate to use in practice of this invention, some even with optional components herein desired already present. This close a relation of the compositions of this invention to prior art calcium hemihydrate compositions allows selection from commercially offered formulations (intended for the use of plasterers or in the manufacture of wallboard) of those formulations containing additives incorporated by the manufacturer (of the formulation) that fit precisely into practice of this invention, using thereby all the advantages imparted by such additives, without detriment to the purposes of the present invention.

However, it should be recognized that the purposes of the present invention, part at least, may be inconsistent with what is desired in plaster or wallboards.

Practice of this invention slurries the molding composition in up to about 50% more water than is usual to form wallboard or plaster, and the excess water evaporates slowly from the cast object. In terms of the present invention, evaporation of much water is a small detriment, whereas the water (while present) and the high porosity characteristic of products of this invention add much to the non-toxic nature of the molding composition and ultimate product. Specifically the molded product formed according to the present invention dries into a low density porous product. Low density, high porosity extends a given weight of molding composition into a greater volume of molded product which is of course advantageous.

The freshly molded object constitutes a composite material of (hydrated) plaster (whose coherency is obtained from interlocked crystals of calcium sulphate dihydrate), and a xanthan gum gel, the latter being similar to pectin gels (jellies), gelatin gels, alginate gels. The excess molding water alluded to above is believed to go into forming the xanthan gel component in the molded object. Xanthan gum is considered unique for practice of this invention. The xanthan gel is believed to add strength and coherency to the freshly molded object allowing its removal from the mold and handling. Later, as the water in the freshly molded object evaporates in time, the xanthan gel component shrinks away, but shrinkage of the molded object as a whole is barely noticeable, creating instead a molded (plaster) object with a high degree of porosity.

Although a porous plaster casting might be expected to have greatly reduced structural coherency vis a vis a non-porous-like casting, the film forming binder propensity of the xanthan gum adds it own strengthening characteristics to the casting so that in total the structural strength and coherency of the molded object wet or dry is quite acceptable to the child. In part the structural strength and coherency of the molded object are attributed to the interlocking of the hydrated gypsum crystals and in part to the presence of a xanthan gum binder.

Presence of the xanthan gum goes far toward making the shaker-molding composition of this invention non-toxic and childproof.

To explain the child-proof character of the present composition the molding method must be considered in detail.

Thus, the shaker-molding technique involves pouring a premixed powder molding composition into a measured amount of tap water in a cup, then capping the cup with the shaker-mold, shaking the mixture long enough to obtain a uniform slurry and, promptly thereafter inverting the cup and mold to pour the mixture into the mold cavity.

The initially fluid aqueous slurry solidifies in what is believed to be the following fashion. Xanthan gum particles solvate, then dissolve converting the vicinity of the xanthan gum particle into an aqueous gel. Simultaneously, the solid particles of calcium sulphate hemihydrate commence reacting with adjoining water molecules to solvate into the dihydrate with the dihydrate particles adsorbing water from around the particles, creating a set of interlocking dihydrate crystals (such as can be found in plaster walls or in wallboard). Very promptly, the competing demands for the water by the xanthan gum and by the dihydrate consume all of the liquid water inside the mold cavity, creating a solid mass which constitutes two interlocked three-dimensional lattices. Overall, the result is a molded article in which a coherent interlocked set of gypsum crystals is latticed with micropores of a viscous xanthan gum solution. A cross-section slice of the dry molded object shows the simultaneous character of the two sets of solvation reactions. The apparently solid plaster is permeated throughout by a multiplicity of pores and microscopic pathways, spaces that once had been filled with the aqueous xanthan gel. The open pore structure is believed attributable to casting of a continuous aqueous phase with solid particles suspended therein (as a discontinuous phase). Chemical and adsorptive removal of water by the hydrating gypsum entraps the xanthan gel inside the plaster object as it forms without, however, completely disrupting the continuous aqueous phase.

Unlike dissolved starch, the xanthan gum does not migrate to the surface of the cast object. Apparently its molecular weight and/or structure is too high for transport. Instead a thixotropic solution forms inside pores and pathways within the freshly molded article.

The composition of this invention has the desired quick setting characteristics. After as little as 5 minutes after mixing, the molded article can be removed from the mold and handled. As might be expected, the freshly molded article is somewhat damp to the touch, and is slightly warm. Gypsum hydrates exothermically, but with a moderate heat of hydration. The high proportion of water employed in practice of this invention, and use of tap water (about 70° F.) limits the temperature rise of 20°–30° F. to acceptable levels during hydration.

As has already been pointed out, the water in excess of what is consumed by the hydration reaction and the water bound up in the xanthan gel will slowly evaporate from the cast article leaving, ultimately, a lightweight porous plaster molding. While lightweight and low density is manifestly desirable for extending the volume of casting produced from a given mass of the molding composition, the most important advantage of the composition resides in its childproof character.

Thus, in considering whether the formulation is childproof it is necessary to accept the possibility that the child using the composition, or some sibling of the child, will simply eat the dry molding composition, the cast article, or will drink the slurry.

Ingestion of the molding powder presents a few problems. It is rather unpalatable so that only a small quantity would be swallowed.

Ingestion of the dry article is more probable. Children are known to eat plaster. Any ingested fragments disintegrate rapidly because of its porosity. Drying out of the xanthan gum has generated pathways and micropores throughout the dry casting. The digestive juices can enter inside the fragment. The xanthan gum itself is metabolizable and, in fact, (food grade) xanthan gum is employed extensively in food substances. Thus, fragments of the molded object would completely disintegrate in the digestive tract and be excreted as individual fine particles. In passing it may be noted that all the ingredients including gypsum, retarders and/or accelerators, etc. conventionally present in gypsum wallboard and in plaster formulations are non-toxic; children and pets have long been known to chew upon plaster and wallboard.

The greatest danger is believed to be that some child will drink the slurry mixture of molding powder and water (rather than place the mixture into the mold). The slurry will set regardless of whether it is in a mold or in some child's alimentary tract. Although the ingredients are non-toxic the danger to be avoided is that the slurry will remain liquid long enough (e.g., thirty minutes) to move from the stomach into the small intestine. Gelation and setting up in the small intestine to form a coherent mass of plaster might well create complete blockage of the small intestine. Hence, the quick 5-10 minute cure herein provided, is both a convenience to the short attention span of a child and a safety measure to insure that the slurry will set before it could be discharged from the stomach. Thus, for example, with a preferred molding powder formulation the slurry commences setting at about 70° F. within not more than about three minutes, and attains about 85% strength within less than 10 minutes. Hence, any ingested slurry has set long before it can be passed from the stomach into the small intestine.

Although the concept of a solid plaster mass forming inside a child's stomach is not a happy thought, it should be pointed out this by itself is not a toxic circumstance. If the child's stomach is empty, the slurry undergoes no dilution before it sets in the stomach. If the stomach is not empty, then the slurry undergoes little, if any, dilution from what is already a high water content slurry.

It may be noted that although diluted suspensions of gypsum normally settle out in the water to create a rather dense bottom layer covered by a dilute suspension of gypsum particles in an upper layer, this action will not take place with the compositions of this invention. Xanthan gum is cold-water soluble and very quickly forms a thixotropic gel which prevents the (relatively dense) hemihydrate particles from settling out. Accordingly, diluted by stomach contents or not the ingested slurry would set up at the bottom of the stomach, leaving the stomach opening to the small intestine clear of the plaster-like mass that forms in the stomach. The setting circumstances are non-hazardous because of the relatively low temperature rise caused by the exothermic cure reaction. Thus, for example, a 70° F. room temperature water slurry sets to a body heat damp mass.

Over a reasonably brief period of time, the stomach juices will hydrolyze and digest the xanthan gum (together with any starch which may be in the molding powder formulation). Digestability is important since the xanthan gum gel component creates internal channels in the molded mass that then allow the digestive juices to penetrate deep into the molded mass. This tends to increase the surface area available to digestive action over 100 fold and literally causes a "spalling" effect. Hence, solid blockages of any type are reduced to smaller (less than "0.5" cross-section diameter) particles. Such particles are readily dissolved and crushed by the body's digestive action and peristalic movement. With continued residence in the aqueous milieu of the stomach, the surface of the molded mass becomes sufficiently soft and pasty for the peristalic movement characteristic of digestive action to erode the mass so as to pass the particles of hydrated gypsum into the intestines and ultimately out of the digestive system. Erosion at the outer surface of the molded mass includes a spalling effect. Digestion of the xanthan gum and solvation of the gypsum at the pore and pathway walls decrease structural coherency at the surface regions of the porous molded mass.

Animal feeding tests have demonstrated that the ingestion of the molding composition slurry is non-toxic.

PREFERRED EMBODIMENTS OF THE INVENTION

Xanthan gum, a crucial component in the present composition, may be unique for purposes of this invention. Xanthan is a long chain polyscarroxides with side chains derived from the bacterial fermentation of carbohydrate sources. Aside from being non-toxic and digestible, xanthan gum is cold-water soluble, particularly when finely divided. For example, the superfine grades are 75% soluble in 70° F. tap water within 60 seconds and 100% soluble within 90 seconds. Thus, when suspended in water, the xanthan gum almost immediately dissolves, increasing the viscosity of the water sharply, then rapidly converting the water into a thixotropic gel. Moreover, dissolution and gelation are unaffected by presence of calcium ions in the water. In addition, there is no indication that the xanthan gum migrates to the surface of the molded article, the way soluble starch, for example, is reported to migrate. Xanthan gum may constitute from 0.25% to 1.5% by weight of the molding powder composition.

Since dissolution of the xanthan gum in the slurry water competes with the hydration reactions that take place in the slurry during the molding operation, the xanthan gum should be finely divided. Test specimens often indicate incomplete dissolution of the xanthan gum despite the rapidity with which this gum dissolves in tap water and despite use of very fine particle sizes.

The xanthan gum need not be the sole gelling ingredient in the molding power formulation. Locust bean or guar gum or both may be included in quantities of up to about 50% of the xanthan gum content, i.e., up to about $\frac{3}{4}$% by weight in the formulation, a 50-50 (by weight) mixture of xanthan gum or guar locust bean gum, and a 50-25-25 mixture, being exemplary proportions. Alternatively, an ethylene oxide condensate (Polyox, for example) may replace some of the xanthan gum. A 70:30 by weight mixture of xanthan gum and polyethylene oxide being a preferred mixture.

Soluble starch may be included in the formulation in amounts up to about 1½% by weight but not in substitution for any of the xanthan gum. Starch which is reported to migrate to the surface of molded gypsum articles, is advantageous for forming a base coat on the molded object in case the child wishes to color the molded article.

Calcium sulphate hemihydrate is, of course, the other crucial component in the molding powder formulation. The formulation could, in fact be nothing more than 0.25–1.5% xanthan gum and the balance calcium sulphate hemihydrate.

However, advantage is taken of the many advances made in the plaster and wallboard art. Thus, for example, the hemihydrate is available in two forms; alpha plaster and beta plaster, with alpha plaster being a large particle binder, while beta plaster being a small particle binder. In practice of this invention, the best results have been obtained by using both alpha and beta plaster in proportions of 1:3 to 3:1.

Conveniently, alpha plaster is commercially available already formulated with soluble starch and preservatives, both of which are mildly desirable in the molded product of the present composition.

Optionally, certain other minor ingredients may be included in the molding powder formulation to control the set time of the gypsum. One such ingredient is calcium sulphate dihydrate as 0–15% by weight of the formulation. The dihydrate acts as an accelerator by providing dihydrate sites in aid of crystal formation while the hemihydrate hydrates.

Another optional minor ingredient is 0–7.5% by weight of potassium sulphate, a substance which is considered to be an accelerator within the context of this invention although some prior workers in the art have suggested adding potassium sulphate for retardation purposes.

The composition may also include non-toxic colorants and preservatives in minor but effective proportions (certainly less than 1% by weight of the formulation).

Thus, to pose the molding formulation as a whole : the finely divided Xanthan gum is from about 0.25–1.5% of the composition, from 0–7.5% of potassium sulphate is present, with preferably, at least 0.5% being present, from 0–15% of calcium sulphate dihydrate is present, with preferably, at least 0.5% being present; up to 0.5% of a colorant may be employed, and nominal but effective amounts of non-toxic preservatives may be included. The balance of the formulation is, of course, the calcium sulphate hemihydrate, preferably as a mixture of the alpha and beta forms within the aforementioned 1:3 to 3:1 proportions.

A preferred embodiment of the formulation is tabulated below.

| Formulation | % by weight |
| --- | --- |
| Xanthan gum (fine particle size) | 0.60 ± 0.10 |
| $K_2SO_4$ | 2.00 ± 0.20 |
| $CaSO_4 2H_2O$ | 4.00 ± 0.50 |
| Misc (colorant, preservative) | 0.40 ± 0.10 |
| Alpha plaster #1 statuary (contains corn starch, fungicide) | 58.0 ± 3.0 |
| Beta plaster (Denscal$^R$) | 35.0 ± 3.0 |
| | 100.00 ± |

One hundred parts by weight of this exemplary formulation is intended for admixture with 135 parts by weight of tap water.

In the fabrication of the usual plaster wall or wallboard a substantial excess of water over that needed for water of hydration is employed, but nonetheless the art speaks of minimizing water use. The usual weight ratios for plaster and wallboard are in the range of about 120–150 parts by weight of dry formulation per hundred parts of water. Even then the bulk of the water, 90% for example, must be evaporated to obtain the ultimate dry product. The present invention contemplates mixing the formulation with a large quantity of water; desirably the ratio is 60–90 parts by weight of the dry formulation to 100 parts of water. Of course, much of the water forms into the Xanthan gum gel component in the pores, micropores and (microscopic) channels latticed throughout the molded article. In due course, the cast article will, of course, dry into a porous lightweight object with almost no shrinkage from its as-cast dimensions.

Damp or dry, the cast object is an integral article with structural strength adequate to maintain its shape and to allow handling by the child. It should be appreciated, however, that gypsum is a sufficiently fragile material of construction to accommodate those children who enjoy breaking their toys when they have finished playing with them.

The shaker molding system of U.S. Pat. No. 3,989,220 employed with the composition and method of this invention allows the child to fabricate any number of duplicate figurines. As far as a destructive child is concerned, that may be the game—make them, then break them, make new ones, etc.

I claim:

1. A method of forming a molded plaster object which comprises mixing together approximately 100 parts by weight of water and 60–90 parts by weight of a molding powder by weight, said molding powder comprising calcium sulphate hemihydrate and finely divided xanthan gum in quantities of from 0.25%–1.5% by weight of the molding powder thereof placing the mixture in a mold, allowing the mixture to solidify in said mold, removing the solidified, shaped mixture from the mold, and allowing same to dry to form a porous, low-density plaster object.

2. The method of claim 1 containing about 70 parts of the molding powder.

3. A molding powder consisting essentially of 0.25–1.5% by weight of finely divided Xanthan gum, 0–7.5% $K_2SO_4$, 0–15% $CaSO_4.2H_2O$, and the balance $CaSO_4.\frac{1}{2}H_2O$.

4. The molding powder of claim 3 further containing minor amounts of starch, colorant and preservatives.

5. The molding powder of claim 3 wherein the $CaSO_4.\frac{1}{2}H_2O$ is a mixture of alpha and beta $CaSO_4.\frac{1}{2}H_2O$ in a proportion of 1:3 to 3:1.

6. The molding powder of claim 3 further containing at least one member selected from the group consisting of locust bean gum, guar gum and polyethylene oxide.

7. The porous plaster object formed by the method of claim 1.

* * * * *